United States Patent [19]

Bainbridge

[11] Patent Number: 5,004,018
[45] Date of Patent: Apr. 2, 1991

[54] INSULATED EXHAUST PIPE AND MANUFACTURE THEREOF

[75] Inventor: David W. Bainbridge, Littleton, Colo.

[73] Assignee: Manville Corporation, Denver, Colo.

[21] Appl. No.: 386,754

[22] Filed: Jul. 31, 1989

[51] Int. Cl.⁵ .................... F16L 9/14; F01N 3/00
[52] U.S. Cl. ........................ 138/149; 138/147; 138/122; 60/322; 60/282
[58] Field of Search ............... 138/147, 149, 121, 122; 60/320, 322, 282; 432/233, 234; 181/207, 222, 212; 428/34.5, 34.6

[56] References Cited

U.S. PATENT DOCUMENTS

| | | | |
|---|---|---|---|
| 1,513,723 | 10/1924 | Bohlander | 138/147 |
| 1,710,577 | 4/1929 | Hahn | 138/147 |
| 1,969,374 | 8/1934 | Kleffel | 138/149 |
| 3,864,909 | 2/1975 | Kern | 60/322 X |
| 3,937,590 | 2/1976 | Mani | 181/207 X |
| 4,251,590 | 2/1981 | Rubright et al. | 138/149 X |
| 4,307,756 | 12/1981 | Voigt et al. | 138/149 |
| 4,345,430 | 8/1982 | Pallo et al. | |
| 4,351,365 | 9/1982 | Bauermeister et al. | 138/149 |
| 4,867,269 | 9/1989 | Lalikos | 181/207 |

FOREIGN PATENT DOCUMENTS

| | | | |
|---|---|---|---|
| 3044872 | 8/1982 | Fed. Rep. of Germany | 138/149 |
| 29224 | 3/1977 | Japan | 138/149 |
| 1135998 | 1/1985 | U.S.S.R. | 138/149 |
| 831626 | 3/1960 | United Kingdom | 138/147 |

*Primary Examiner*—William A. Cuchlinski, Jr.
*Assistant Examiner*—Joseph A. Rhoa
*Attorney, Agent, or Firm*—John D. Lister; Cornelius P. Quinn

[57] ABSTRACT

An insulated exhaust pipe comprising inner and outer spaced corrugated metallic tubes separated by refractory fiber isulation. Strips of higher density refractory fiber insulation hold the low density insulation in place during operation and prevent degradation of the fiber by vibration. The pipe is made by rolling the inner tube over a layer of insulation, including strips, to which adhesive has been applied. The insulated tube is then inserted into the outer tube, rotating the insulated tube so that the corrugations of the outer tube do not damage the insulation. Specific structure for carrying out these method steps is disclosed.

7 Claims, 5 Drawing Sheets

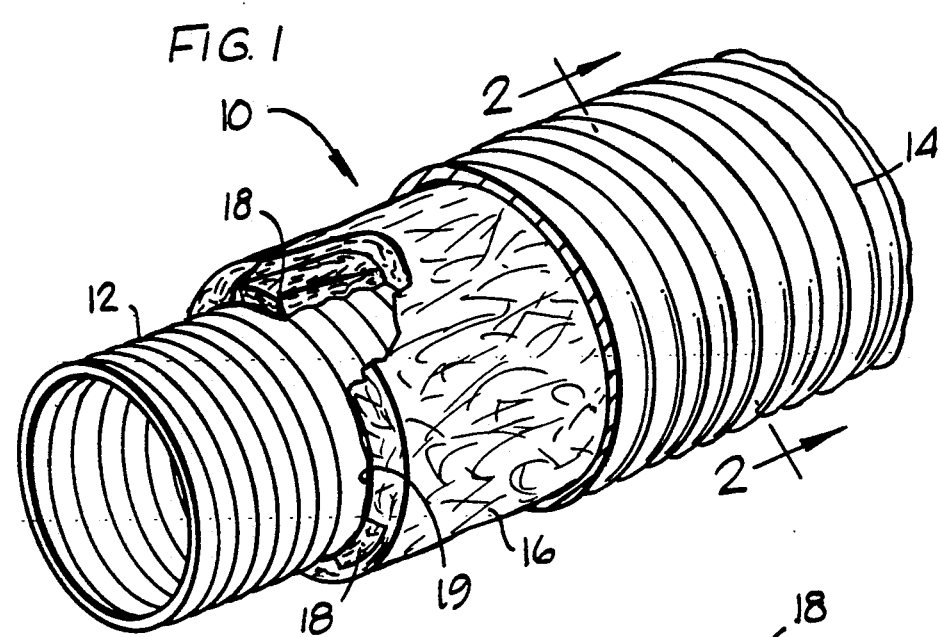
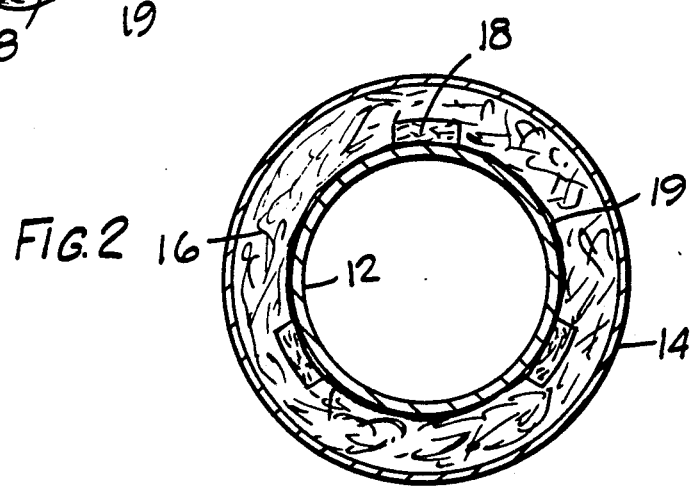
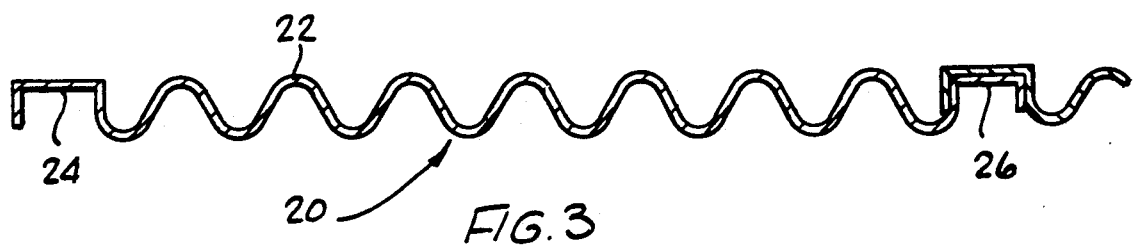
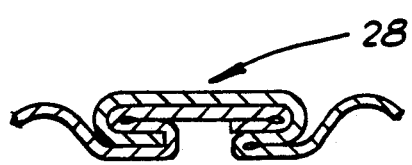

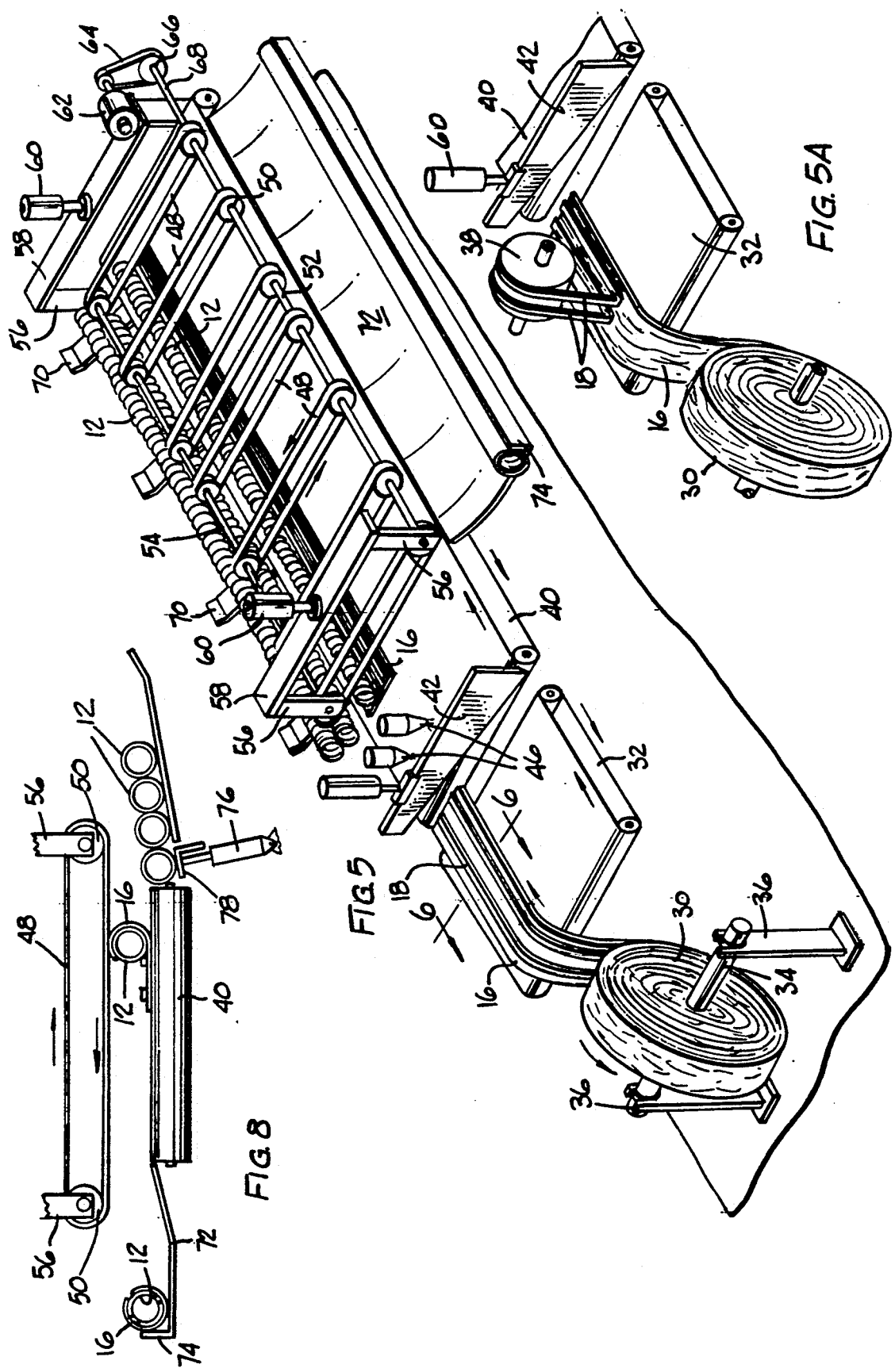

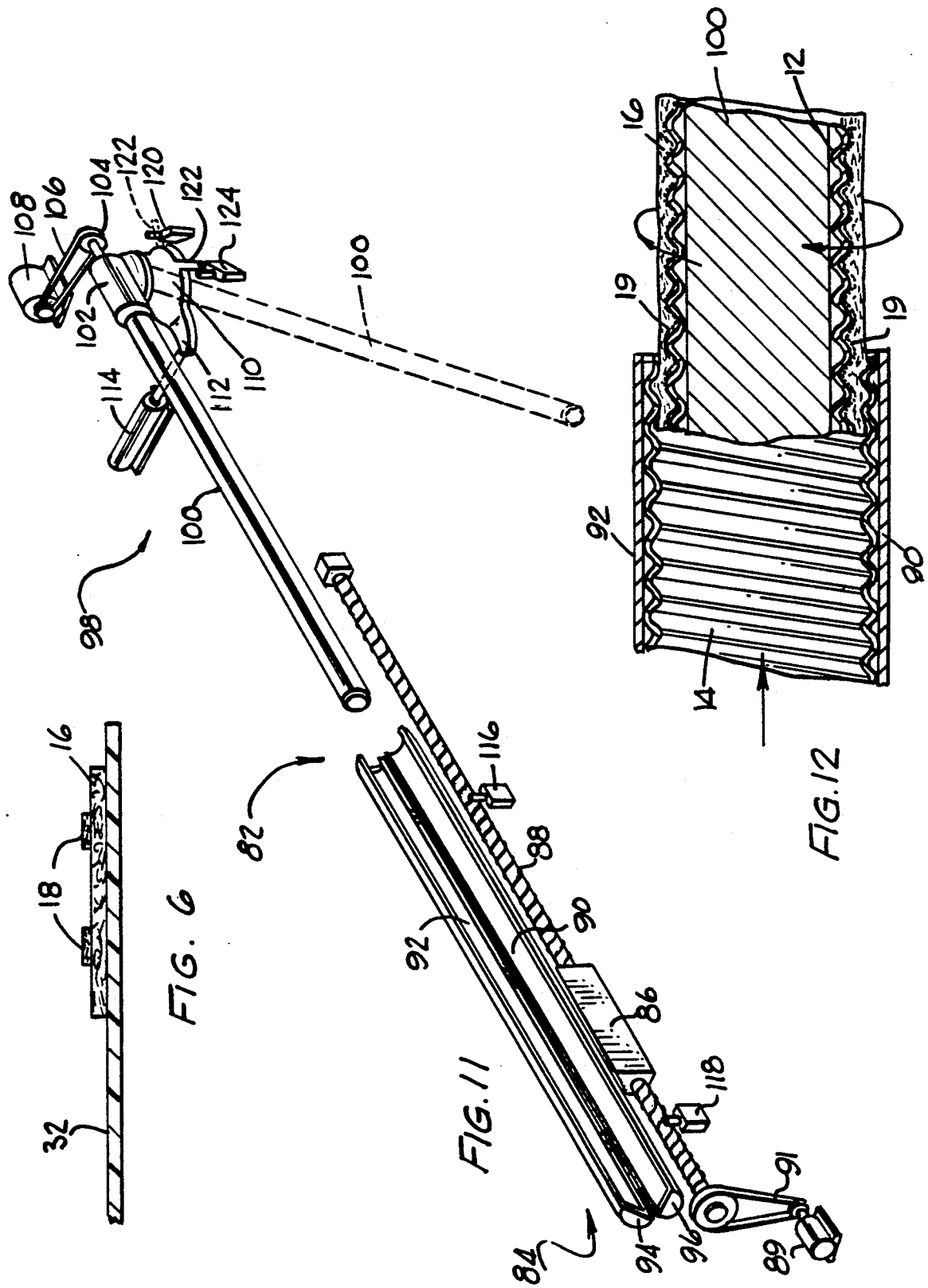

INSULATED EXHAUST PIPE AND MANUFACTURE THEREOF

FIELD OF THE INVENTION

This invention relates to insulated pipe. More particularly, it relates to insulated pipe adapted for use in the exhaust system of a vehicle powered by an internal combustion engine. The invention further relates to apparatus and method for manufacturing such pipe.

BACKGROUND OF THE INVENTION

Catalytic converters are conventionally included in the exhaust system of automotive vehicles to reduce the level of pollutants discharged to the air. While it is generally believed that the catalytic converters used today perform satisfactorily once their light-off temperature is reached, a pollution problem exists during the light-off period. For example, it has been determined that 90% of the pollutants exhausted to the atmosphere from an exhaust system which includes a catalytic converter are formed during the light-off period. As used herein, the light-off temperature is the temperature at which a catalytic converter catalyzes the reaction that takes place in the converter with the exhaust gases. The catalytic light-off period is the time required for the catalytic converter to reach its light-off temperature.

If the heat of the exhaust gases, which can reach temperatures as high as 1800° F. in turbo-charged automobiles, can be retained for a longer period of time than in conventional exhaust systems, the time required for the light-off temperature to be reached will be reduced. This would then reduce the duration of high pollution, and in turn reduce the amount of pollutants released to the atmosphere.

Attempts have been made in the past to develop insulated exhaust systems. Double exhaust pipes have been suggested, comprising spaced inner and outer pipes. Although this reduces the amount of heat loss, it is not enough to appreciably retain heat at the level required for optimum catalytic converter operation.

Another suggestion is found in U.S. Pat. No. 4,345,430, issued to Pallo et al. In that patent a double pipe system comprised of inner and outer corrugated metal tubes is disclosed. In addition, the use of insulation between the inner and outer tubes is suggested. Various types of insulation materials capable of withstanding temperatures up to 1600° F. are suggested in the patent. At the temperature requirements of modern automobiles and catalytic converters, however, refractory fiber insulation is the most practical choice of insulation to be used.

Although refractory fiber is capable of resisting the high temperatures to which it would be exposed and of providing the necessary degree of insulation, it is a very fragile material. When used in an insulated exhaust system such as that disclosed in U.S. Pat. No. 4,345,430 it was found that the physical stresses to which it was exposed during use caused it to be reduced to small dust-like particles. In this condition it was no longer able to provide satisfactory insulation. Obviously, if refractory fibers are to be used in an insulated exhaust system they must be be capable of resisting degradation.

Moreover, a manufacturing process must be found to efficiently produce a length of double pipe which has refractory fiber insulation in the space between the pipes. This problem was addressed in U.S. Pat. No. 4,345,430, but the proposed solution was not found to be practical. It was suggested to form a first relatively small tube of spirally wound corrugated metal and to spirally wind a layer of refractory fiber felt onto the tube. To encase the insulated tube in another larger tube, it was suggested to spirally wind a second corrugated metal tube directly over the insulated tube. This method is too difficult to regulate and the required machinery to carry it out would be too complicated and expensive. Excessive pressure on the felt as it is being wound about the corrugated tube tends to tear the felt, and it is difficult to precisely wind the felt so as to avoid overlaps and gaps between windings. Further, maximum efficiency in producing the outer corrugated tube cannot be attained by winding adjacent corrugated strips about a previously formed insulated pipe while at the same time forming seams from the adjacent edges of the strips.

A much simpler and more reliable method of manufacture is needed for the commercial production of an insulated exhaust pipe.

SUMMARY OF THE INVENTION

In accordance with one aspect of the invention an insulated pipe for use in the exhaust system of a vehicle powered by an internal combustion engine comprises spaced concentrically arranged inner and outer metallic tubes, with refractory fiber insulation filling the space between the tubes. A major portion of the insulation is relatively low density refractory fiber insulation, while a minor portion is relatively high density refractory fiber strip means extending along the length of the pipe. The high density strips inhibit movement of the low density fiber to prevent degradation of the low density fiber during operation of the vehicle. The strip means preferably comprise a plurality of strips which are equally spaced circumferentially from each other, the thickness of which is greater than half the radial thickness of the space between tubes. The density of the low density insulation is in the range of 4 pcf to 16 pcf, which allows the insulation material to be flexible enough to wrap around the pipe. The high density insulation is in the range of 24 pcf to 28 pcf material, providing enough body and strength to resist the stresses to which the unit is subjected and also to hold the low density fibers in place against the forces of vibration.

In another aspect of the invention the insulated pipe is manufactured by introducing a layer of refractory fiber insulation to a work station, adhering the insulation to the periphery of the small diameter tube and then inserting the insulated tube into the larger diameter tube so that the layer of insulation is in contact with the second tube. The step of adhering the insulation layer to the small tube is carried out by rolling the tube, after having first applied adhesive to the insulation or to the tube, over the insulation to hold the insulation in place. The insulation is introduced to the rolling station by pulling a length of it from a roll onto the conveyor that carried it to the station.

The larger tube is a spirally wound corrugated metallic tube which is caused to have relative reciprocal movement toward the insulated smaller tube. The insulated smaller tube is rotated with respect to the larger tube so that the speed of the relative rotation is coordinated to the speed of the relative reciprocal movement to cause the insulated tube to be threaded into the corrugations of the larger tube without damaging the fibrous insulation.

Other features and aspects of the invention, as well as other benefits thereof, will readily be ascertained from the more detailed description of the preferred embodiment which follows.

BRIEF DESCRIPTION OF THE DRAWINGS

FIG. 1 is a pictorial view of the insulated exhaust pipe of the invention, with portions of the elements thereof being broken away to better expose its structure;

FIG. 2 is a transverse sectional view taken on line 2—2 of FIG. 1;

FIG. 3 is an enlarged transverse sectional view of a corrugated metal strip used to form the corrugated exhaust tubes;

FIG. 4 is an enlarged transverse sectional view of the seam between adjacent strips in a corrugated tube;

FIG. 5 is a pictorial view of the apparatus for wrapping the inner tube with insulation;

FIG. 5A is a partial pictorial view showing a modified form of the insulation feeding means of FIG. 5;

FIG. 6 is a transverse sectional view of the insulation being fed to the wrapping apparatus, taken along line 6—6 of FIG. 5;

FIG. 8 is an end view of the apparatus of FIG. 5, showing the wrapping operation;

FIG. 11 is a pictorial view of the apparatus for inserting an insulated tube into a larger tube; and FIG. 12 is an enlarged partial transverse sectional view showing the movement of an insulated tube into a larger tube.

DESCRIPTION OF THE PREFERRED EMBODIMENT

Figure 7A:
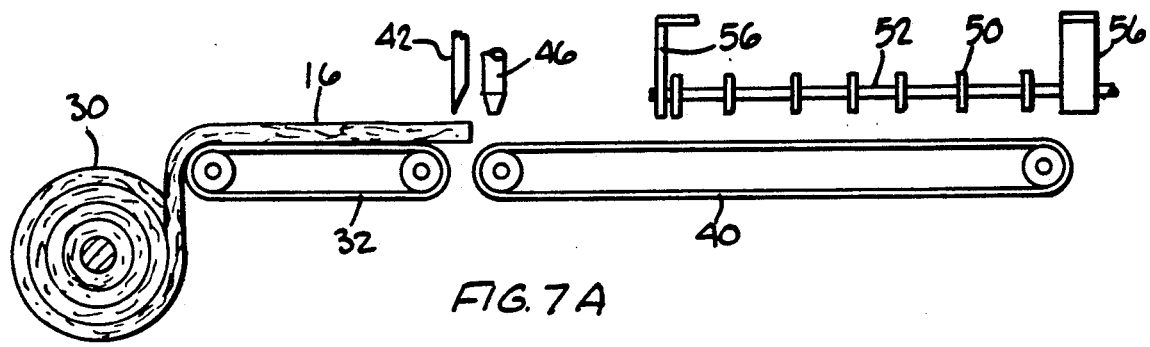
FIGS. 7A, 7B and 7C are schematic side elevations of the wrapping apparatus of FIG. 5, showing the apparatus in sequential stages of operation.

Referring to FIGS. 1 and 2, the exhaust pipe 10 of the invention comprises an inner corrugated metal tube 12, an outer corrugated metal tube 14 and a layer of refractory fiber insulation 16 between the tubes. The insulation 16 completely fills the space between the tubes 12 and 14 and further contains spaced longitudinal refractory fiber strips 18 extending radially from the inner tube 12 for a distance greater than half the radial thickness of the space between the tubes. Preferably, in accordance with the method of fabricating the exhaust pipe, the insulation 16 and the strips 18 are adhered to the inner tube 12 by a coating or layer of adhesive 19.

The insulation 16 comprises refractory fibers because they are capable of withstanding the high temperatures of exhaust gases from automotive engines and because the material is lightweight. The fibers are preferably provided in the form of blankets for ease of handling and to meet the demands of the pipe fabrication process. Various grades of refractory fiber blankets are commercially available, depending on the temperatures to which the insulation will be exposed in operation. Cerawool Blanket for service up to 1600° F., Cerablanket for service up to 2400° F., and Cerachem and Cerachrome Blankets for service up to 2600° F. are all available from Manville Sales Corporation and will function well in the insulated pipe of the invention. Refractory fiber blankets such as these are formed from very pure alumina, silica and other refractory oxides, a typical general formulation being 40% to 60% by weight of silica, 40% to 60% by weight of alumina and 0 to 10% by weight of oxides such as chromia, iron oxide, calcia, magnesia, soda, potassia, titania, boria or mixtures of these oxides. The insulation is able to retain a soft fibrous structure at elevated temperatures and can be needled together for higher mechanical strength. It has low thermal conductivity and low shrinkage, and also provides good sound absorption. Because of their resilient and flexible nature such blankets in a density range of 4 pcf to 16 pcf can readily be wrapped around a pipe to insulate it. Fibrous insulation material such as fiber glass or mineral wool could not stand up to the high temperatures of the gases coming from the manifold of modern vehicles.

Although refractory fiber material of the type discussed above has previously been proposed as an insulating material to be used in an insulated exhaust pipe for an automotive exhaust system, it was found in practice that the insulating properties of the pipe decreased drastically after a period of use. This was surprising in view of the beneficial properties of the refractory fiber. It was found, however, that even though refractory fiber is soft and resilient, it nevertheless is a very fragile material, disposed to degradation under the conditions encountered in automotive use. Specifically, it was found that the vibration to which it was subjected in the normal operation of a vehicle on which insulated pipe was mounted was sufficient to reduce the fiber to dust-like particles. Since the low density refractory fiber insulation performed well in all other respects it was preferable to find a way to protect it from the effects of vibration rather than search for a different, probably more expensive, insulating material.

It was found, surprisingly, that the use of spaced strips of higher density refractory fiber insulation functions to hold the low density insulation in place and to protect it against vibration. The number of strips and their placement obviously may vary, depending upon the dimensions of the pipe. Although higher density insulation performs well at higher temperatures, the lower density insulation blanket 16 is required for its ability to be wrapped about the inner tube 12 and for its better overall insulating performance under wider ranges of temperature. Therefore, the size of the strips will be kept relatively small compared to the volume of low density insulation. It is further preferred that the strips be equally spaced about the periphery of the inner tube for best functioning. While in some circumstances only two strips may be utilized, it has been found that three equally spaced strips provide adequate protection to the lower density insulation while at the same time being present in such minor amounts that the insulating value of the low density insulation is not noticeably changed. In order to provide their reinforcing and stabilizing functions, the strips 18 should extend from the inner tube, as mentioned previously, at least half the radial thickness of the space between the tubes 12 and 14. It is preferred that they stop short of the outer tube 14 in order to avoid direct contact with the outer tube and in order to avoid fabrication problems which such an arrangement might create. The density of the strips is greater than the density of the lower density insulation and preferably is in the range of 24 pcf to 28 pcf. This provides the strips with the properties and qualities needed but leaves them with sufficient flexibility to withstand the fabrication process.

The tubes 12 and 14 are preferably corrugated in order to give the pipe the flexibility needed for installation on various types of vehicles and at various angles. The thickness of the tubes should preferably be in the range of about 0.005 inch to 0.010 inch. If the pipe thickness is less than this amount it will not have enough strength to resist fatigue and very likely will eventually break. If the thickness is greater than this amount it will not have sufficient elongation or malleability to enable the seam between adjacent corrugated strips to be formed during formation of the tubes. This very thin structure substantially reduces the weight of the insulated pipe, with the benefit that the resulting low thermal mass reduces the amount of heat loss and thus reduces the time for the catalytic converter to reach its light-off temperature. The tubes are spaced from each other over their entire length, thus avoiding metal-to-metal contact. This is important because it eliminates areas of greater heat loss and it also acts to isolate exhaust noise.

Referring to FIG. 3, the tubes are formed from a strip of corrugated metal, such as the strip illustrated at 20, by feeding it to a forming roller and mandrel at a predetermined angle to the mandrel in accordance with well known procedures. Such a process, which is described in more detail in U.S. Pat. No. 3,753,363 to Trihey, results in the corrugations of the finished tube extending at an angle to the length of the tube equal to the angle at which the corrugated strip was fed to the mandrel. Such a strip contains a number of parallel corrugations 22 the formation of which by a series of corrugating rollers is well known. Although any suitable seam may be used to connect adjacent strips in forming a corrugated pipe or tube, for purpose of illustration the strip 20 is shown with one edge having a large flange 24 and the other edge having a smaller flange 26. As shown at the right side of FIG. 3, the small flange 26 of one strip fits into the large flange 24 of the adjacent strip. The nested flanges are then subjected to a crushing operation, as is well known in the art, to produce the gas-tight seam 28 shown in FIG. 4, wherein the flat side of the seam corresponds to the inside of the tube. Although the dimensions of the exhaust pipe of the invention will vary according to the specific end use of the pipe, a typical automotive exhaust pipe would have an inner diameter of two inches, with a pitch or on-center spacing of the corrugations of 0.16 inch.

Referring now to FIG. 5, which illustrates the preferred apparatus for wrapping the inner corrugated tube with the refractory fiber insulation, a continuous layer of insulation is pulled from a roll 30 by conveyor 32. The roll 30 is freely mounted for rotation on a shaft 34 resting on suitable supports 36. The insulation rests on the conveyor 32 and is able to be moved by the conveyor belt due to the friction between the insulation strip and the belt. The roll may be provided at the refractory fiber manufacturing plant with a plurality of spaced high density refractory fiber strips 18. Alternatively, as illustrated in FIG. 5A, the roll may consist only of the low density refractory fiber layer 16, and the high density strips 18 may be fed onto the layer from separate rolls 38 of the strips at a point above the conveyor 32. In either case, the layer of low density insulation 16, with strips 18 resting on the upper surface thereof, appears as shown in FIG. 6 during travel on the conveyor 32.

Referring back to FIG. 5, a second conveyor is spaced a short distance downstream from the end of the first conveyor 32. Located between the conveyors above the gap between them is a shear 42 connected to a power cylinder 44 for moving the shear downwardly in a cutting stroke and back up again to its original position. Immediately downstream from the shear are adhesive spray nozzles 46 positioned above the path of travel of the insulation. Downstream from the spray nozzles is a series of laterally oriented endless belts 48. The belts are trained about rolls 50 mounted on shafts 52 and 54, with one of the shafts being rotated to cause all the belts to move at the same time. The shafts are supported in vertical support frame members 56 connected to upper horizontal supports 58, and the entire frame is movable by means of cylinders 60 connected to each horizontal support 58. Any suitable arrangement for rotating the shafts 52 and 54 may be employed, such as the arrangement illustrated wherein motor 62 is also supported on one of the supports 60 and rotates the shaft 52 through a belt 64 and a gear 66 mounted on the end of an extension 68 of the shaft 52.

Located adjacent the series of belts 48 and adjacent one side of the conveyor belt 40 is a tube support rack consisting of spaced inclined ribs or slats 70 on which a supply of the smaller corrugated tubes 12 is supported. Located adjacent the other side of the conveyor belt 40 is a bin consisting of a sloped support shelf 72 and a vertical shoulder 74 for supporting the tubes 12 after they have been wrapped with insulation.

Figure 7B:
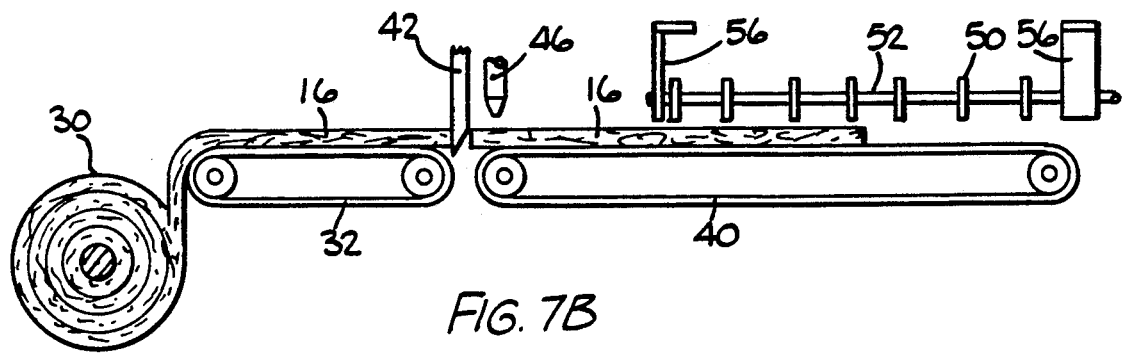
Figure 7C:
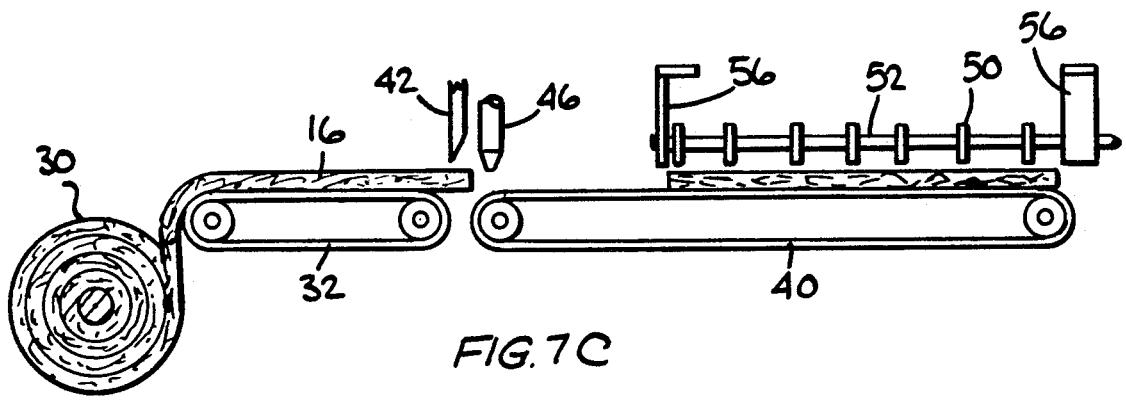

In operation, starting from the position of the insulation shown in FIGS. 5 and 7A, wherein the downstream end of the insulation is resting on the conveyor 40 just beyond the junction between the conveyors 32 and 40 and is slightly upstream from the spray nozzles 46, the conveyors 32 and 40 are actuated. The conveyors pull the insulation, unwinding it from the roll 30 and moving it downstream on the conveyor 40. A photo-electric switch, not shown, actuates the spray nozzles when the insulation moves beneath them. Adhesive is continuously sprayed onto the insulation as it moves downstream. When the insulation reaches the point shown in FIG. 7B, where the distance from the downstream end of the insulation to the shear 46 is almost equal to the desired length of insulation, another photo-electric switch actuates the cylinder 44 which swiftly moves the shear 42 through its cutting stroke while the web of insulation is still moving. After a slight delay, to allow the upstream end of the insulation to reach the spray nozzles, the adhesive spray is shut off and the conveyor 32 is stopped. The conveyor 40 continues to operate, moving the web of insulation downstream until a third photo-electric switch located adjacent the last endless belt 48 shuts off the conveyor 40. The insulation is now in the position shown in FIG. 7C, wherein it is laterally aligned with the series of endless belts 48, with its upstream end being spaced from the downstream end of the insulation still attached to the roll 30.

Referring now to FIG. 8 as well as to FIG. 5, at this point the endless belts 48 are actuated, as is the cylinder 76. The cylinder 76 pushes up tube support 78 which prior to being moved functioned as the lowermost portion of the tube support rack 70. This raises the tube 12 supported thereon to the point shown in FIG. 9, at which time the combination of the inclined support surface 78 and contact between the tube and the moving belts 48 moves the tube onto the insulation 16. The other tubes in the rack 70 do not interfere with the movement of the support 78 due to the guard 80 extending down from the support, which prevents the tubes in the rack from rolling down until the support 78 has been returned to its original position as shown in FIG. 10. As depicted in FIGS. 8 and 10, continued movement of the belts 48 rolls the tube over the adhesive-coated surface of the insulation, causing the insulation to adhere to the tube and to be wrapped around it as the tube is rolled by the belts 48 toward the bin 72.

Figure 9:
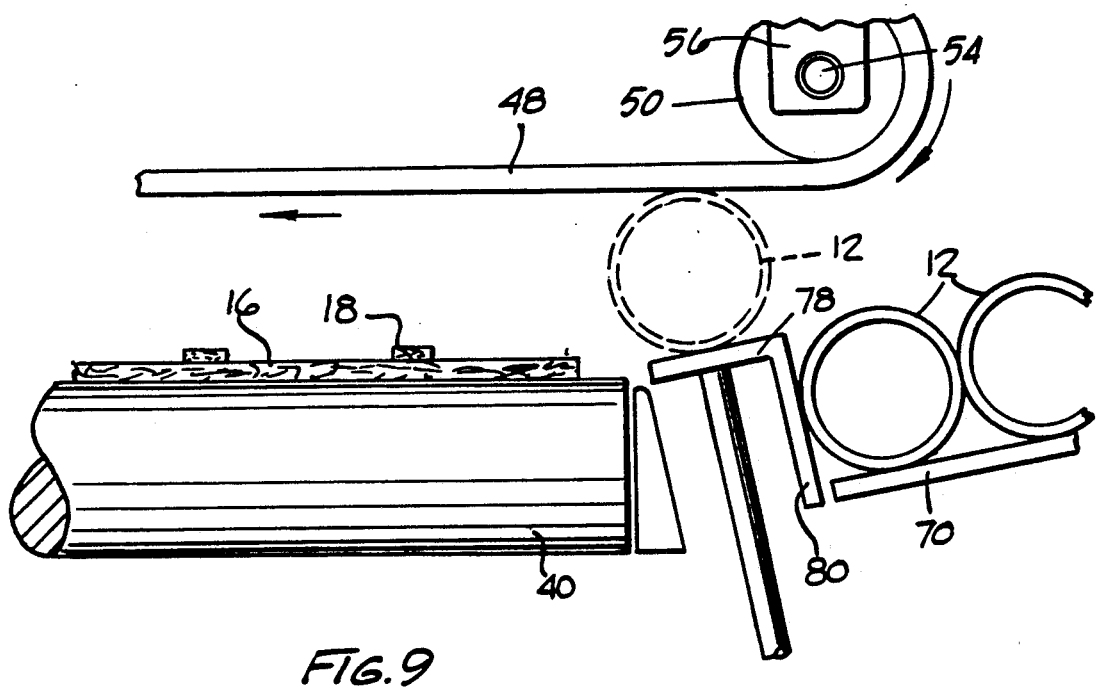
FIG. 9 is an enlarged end view of the tube feeding means shown in FIG. 8.
Figure 10:
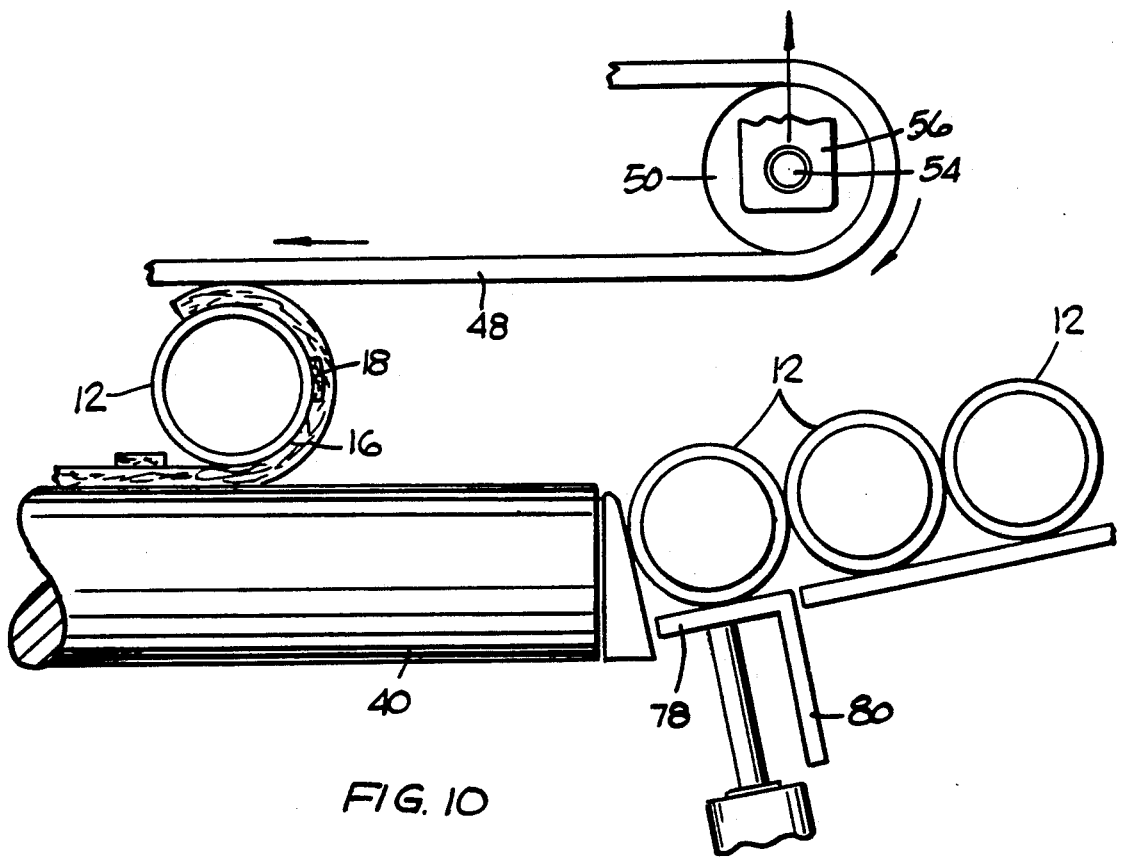
FIG. 10 is a view similar to that of FIG. 9, but showing the apparatus at a later phase of its operation.

Still referring to FIGS. 5, 8, 9 and 10, and particularly to FIGS. 9 and 10, it will be noted that as a tube 12 is wrapped with insulation its effective diameter increases. Thus if the height of the endless belts 48 is set in order to begin rolling the tube over the layer of insulation, it will soon be too low to continue rolling the combined tube and insulation. For this reason the cylinders 60 function to raise the belt support frame 56, 58 at the appropriate time to compensate for the increased diameter of the insulated tube. It will be understood that the cylinders 60 can also be used to raise or lower the frame to allow tubes of different diameters to be wrapped.

Referring now to FIG. 11, in order to insert the insulated tube resulting from the wrapping operation into the larger tube the apparatus 82 is employed. This comprises an elongated clamp 84 mounted on a carriage 86 which in turn is mounted for operative engagement with a screw 88 driven by motor 89 through drive belt 91. The clamp includes a lower element 90 of half-cylindrical shape hinged to an upper element 92, also of half-cylindrical shape. One end of the clamp is closed as at the end walls 94 and 96 of the clamp halves 92 and 90. The other end is open to allow insertion of an insulated tube.

The other part of the tube insertion or stuffing mechanism is a mandrel assembly 98 consisting of mandrel 100 aligned with the clamp 84. The mandrel is mounted in a support bearing 102 which is connected by shaft 104 and drive pulley 106 to motor 108 for rotation thereby. The entire bearing mounting 102 is itself mounted on a pivoting base 110 connected by arm 112 to cylinder 114. Actuation of the cylinder 114 pivots the mandrel assembly to the dotted line position to allow an insulated tube to be loaded onto the mandrel.

In operation, a large diameter corrugated tube is inserted into the bottom half 90 of the tube clamp 84 and the upper half 92 is closed. A suitable latch mechanism, not shown, for holding the clamp shut would be provided. An insulated small diameter corrugated tube is slipped over the mandrel 100. The dimensions of the clamp and mandrel are designed to receive the tubes so that the larger tube is tightly held in the clamp while the smaller insulated tube is slidably fitted on the mandrel. The mandrel is then rotated by the motor 108 and the screw 88 is rotated by the motor 89. This causes the carriage 86 and the clamp 84 supported thereon to move toward the mandrel 100. The mandrel and the insulated tube 12 carried by the mandrel will thus move into the clamp 84 and into the outer tube 14 held in the clamp. When the mandrel has reached the desired position within the clamp, the screw carriage 86 contacts limit switch 116, causing the motor 89 to be reversed to move the clamp 84 back toward its starting position, thereby withdrawing the clamp and the insulated tube from the mandrel. When the carriage 86 reaches the limit switch 118 the motor 89 is stopped, halting the travel of the carriage and clamp. In addition, the limit switch 118 activates the cylinder 114 to pivot the mandrel 100 to its dotted line position for reloading. Contact of limit switch 120 by arm 122 carried by the pivoting base 110 of the mandrel assembly causes the cylinder to stop pivoting the mandrel 100. After the clamp and mandrel have again been loaded with tubes a switch to pivot the mandrel base assembly back to its operative position would be actuated by hand. The mandrel would stop at the appropriate time to be once again aligned with the centerline of the clamp by the arm 122 contacting another limit switch 124 and causing the cylinder 114 to be deactuated.

As best shown in FIG. 12, while the clamp 84 is moving the outer corrugated tube 14 toward the mandrel 100 the mandrel is being rotated. The direction of rotation is in the same direction as the inclination of the corrugations in the inside diameter of the tube 14, and the speed of rotation of the mandrel is correlated with the speed of axial movement of the carriage and clamp so that the insulation 16 is effectively screwed into the outer tube 14, with the corrugations of the tube 14 acting as threads. This prevents the insulation from becoming damaged, as could happen if it were pushed or forced into the tube 14 without the threading action, and permits a tight fit of the insulation between the inner and outer tubes. The insulation thus extends completely from the inner tube to the outer tube, preventing metal-to-metal contact between the inner and outer tubes.

It will be understood by those skilled in the art that the sequence and speed of the various operations described in the manufacture of the exhaust pipe can readily be controlled by any of a number of available relatively simple computer programs.

It will now be appreciated from the foregoing description that the insulated pipe of the present invention is a simple, effective and economical solution to the problem of how to retain the heat from exhaust gases prior to the gases reaching the catalytic converter. The method and apparatus for manufacturing the pipe is simple yet highly effective in being able to produce the pipe on a production line basis while maintaining the necessary quality control.

It should now be understood that the exhaust pipe of the invention and the method and apparatus for its manufacture are not necessarily limited to all the specific details described in connection with the preferred embodiments. It is contemplated that changes which do not affect the overall basic function and concept of the invention may be made by those skilled in the art without departing from the spirit and scope of the invention, as defined in the appended claims.

What is claimed is:

1. An insulated pipe for use in the exhaust system of a vehicle powered by an internal combustion engine, comprising:
   an inner metallic tube;
   an outer metallic tube spaced from and concentrically arranged with respect to the inner metallic tube; and
   refractory fiber insulation filling the space between the inner and outer tubes;
   a major portion of the insulation comprising relatively low density refractory fiber insulation which is subject to degradation from vibration;
   a minor portion of the insulation comprising a plurality of relatively high density refractory fiber insulation strips extending substantially continuously along the length of the inner tube;
   the high density strips being circumferentially spaced from each other and having a radial thickness to provide a means to inhibit movement of the low density fiber during operation of the vehicle to thereby prevent degradation thereof.

2. The insulated pipe of claim 1, wherein both the relatively low density refractory fiber insulation and the relatively high density refractory fiber insulation are able to withstand temperatures of at least 1600° F.

3. The insulated pipe of claim 2, wherein the relatively low density refractory fiber insulation has a density in the range of approximately 4 pcf to approximately 16 pcf and the relatively high density strips have a density in the range of approximately 24 pcf to approximately 28 pcf.

4. The insulated pipe of claim 3, wherein the strips are substantially equally circumferentially spaced apart.

5. The insulated pipe of claim 4, wherein there are three strips of relatively high density refractory fiber insulation.

6. The insulated pipe of claim 3, wherein the inner and outer tubes are corrugated tubes having wall thicknesses in the range of approximately 0.005 inch to approximately 0.010 inch.

7. The insulated pipe of claim 1, wherein the strips have a radial thickness greater than half the radial distance between the inner and outer tubes.

* * * * *